United States Patent [19]

Yoshida

[11] Patent Number: 4,516,862
[45] Date of Patent: May 14, 1985

[54] ELECTRONIC TIMEPIECE HAVING ADDRESS DESIGNATION CIRCUITS OF ROM AND RAM

[75] Inventor: Yosuke Yoshida, Tokyo, Japan

[73] Assignee: Kabushiki Kaisha Daini Seikosha, Tokyo, Japan

[21] Appl. No.: 500,252

[22] Filed: Jun. 2, 1983

[30] Foreign Application Priority Data

Jun. 4, 1982 [JP] Japan ................................ 57-95887
Jun. 4, 1982 [JP] Japan ................................ 57-95888

[51] Int. Cl.³ ............................................. G04C 15/00
[52] U.S. Cl. ................................................. 368/155
[58] Field of Search ............... 368/10, 85–87, 368/155–156, 217–219; 364/569, 705, 710, 200

[56] References Cited

U.S. PATENT DOCUMENTS 4,257,116  3/1981  Asano et al. ........................ 368/69
4,386,423  5/1983  Sasaki et al. ........................ 368/73
4,415,271  11/1983  Mori .................................... 368/41

Primary Examiner—Vit W. Miska
Attorney, Agent, or Firm—Robert E. Burns; Emmanuel J. Lobato; Bruce L. Adams

[57] ABSTRACT

In an LSI for an electronic watch having a ROM and a RAM, the content of the RAM is rewritten by the interpretation and execution sequentially for time counting control and other controls. The address designation method of the ROM comprises a Program Counter Method for designating the next instruction address to be executed by a program counter and for numerical computation, and a Next Address Designation Method for designating directly by a fixed field value in an instruction and for the software for the watch. The two methods are employed selectively by the kind of instructions so that an emit-field may be used for other purposes such as the operation of a value which extends over several words of the RAM as a single instruction.

4 Claims, 6 Drawing Figures

ELECTRONIC TIMEPIECE HAVING ADDRESS DESIGNATION CIRCUITS OF ROM AND RAM

BACKGROUND OF THE INVENTION

The present invention relates to an electronic timepiece including a ROM address designation circuit and a RAM address designation circuit and more particularly, to an electronic timepiece using a Program Counter Method and Next Address Designation Method in the address designation of the ROM and a method for operating a value which extends over several words of the RAM as a single value by a single instruction.

In accordance with a remarkable expansion of digital electronic watch functions, microprocessor type LSIs for watches, i.e., LSIs of the type comprising ROM and RAM and a program written in the ROM is sequentially interpreted and executed for time counting and various controls while rewriting the value of RAM, have been put into a practical use.

This type of LSIs are expected to have increasingly sophisticated functions in accordance with an expansion in capacity of digital wrist watches as portable information instruments.

The instructions to be executed are stored in the ROM of this type of LSIs. There are two methods for designating the instruction address to be executed. One method is the "Program Counter Method" in which a program counter is employed, and the next address to be executed is designated by the content of the program counter. Incrementing of the program counter is automatically made in executing a certain instruction. The other method is the "Next Address Designation Method" in which a "field" of instruction of ROM is settled to designate all or a part of the next address to be executed. The program counter method is effective in constructing a software such as shown in FIG. 1, i.e., a software which is comparatively linear and which has less branches and judges. On the contrary, the next address designation method is effective in constructing a software such as shown in FIG. 2, i.e., a software which has many branches and judges. For determining which method is to be adopted for use in watch LSIs, a conventional software for watch has been analyzed. It has been found from such analysis that a software for watches belongs to that shown in FIG. 2. Namely, the software has many branches and judges and a numerical computation is simple. Accordingly, it seems effective to adopt the next address designation method for LSIs to realize the watch specifications. To realize a future multi-functioned digital wrist watch, however, it is desirable that LSIs can program a numerical computation. The numerical computation program is analyzed to be approximate to the software as shown in FIG. 1. It shows that it is effective to adopt the program counter method for LSIs which realize the specifications as numerical computation and shorten the word length of the ROM.

As illustrated, in view of the address designation of the ROM, it can be said that the software for watches includes the elements which are inconsistent with the software for the numerical computations.

SUMMARY OF THE INVENTION

It is an object of the present invention to provide an address designation method of a ROM effective both for the softwares for watches and numerical computations by alternatively employing the program counter method and the next address designation method according to the kind of instructions for designating the ROM addresses.

It is another object of the present invention to reduce the hardware in a microprocessor type LSI for watches by controlling a pointer which designates the RAM address with a logic necessary for the program counter, taking advantage of the feature that the next ROM address need not be designated during the continuous arithmetic operations.

PREFERRED EMBODIMENTS OF THE INVENTION

Figure 3:
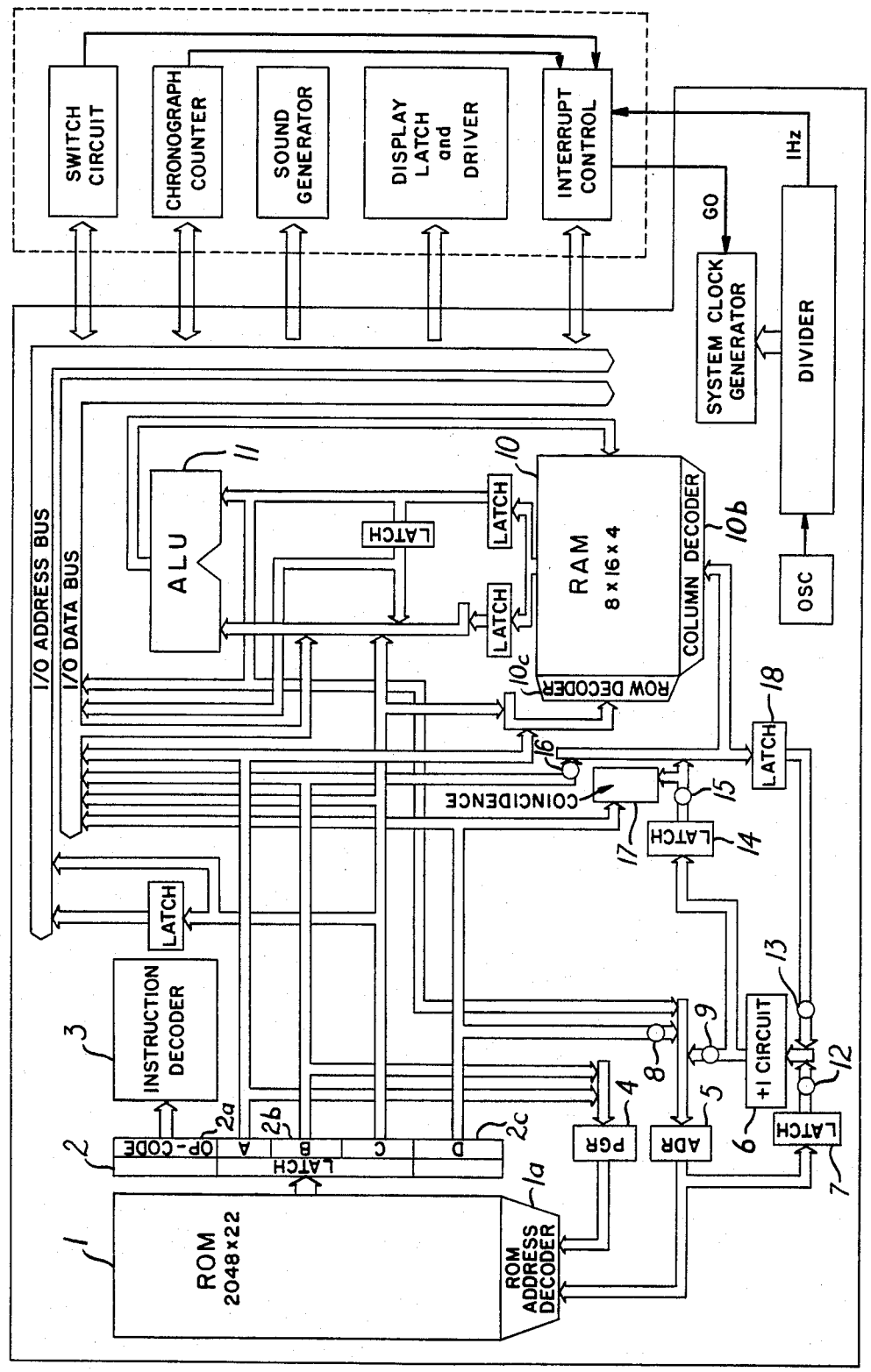
FIG. 3 is a block diagram of a wrist watch using the present invention.

The block diagram of a wrist watch employing this invention is shown in FIG. 3, in which the section enclosed by solid lines is a "Central Processor Unit" (CPU), which I have developed at this time, and the section enclosed in broken lines is hardware peculiar to the watch specifications. For instance, the hardware necessary for constituting a watch with alarm and chronograph functions are illustrated in FIG. 3.

The CPU has a 4 bit I/O Address Bus, an 8 bit I/O Data Bus and the control signals which control the external hardware peculiar to the watch specifications. A 32 KHz quartz crystal is used in the oscillating circuit. The system clocks are generated by outputs of the dividing circuit up to 4 KHz. One machine cycle of the system is about 240 μsec. With the object of saving current consumption, these system clocks can be shut down by suitable instruction when the CPU is not necessary to be activated. However, when the CPU is to be activated, the signal "GO" is necessary to be changed from low to high.

The instruction word length of the ROM, which stores a program, is 22 bit/word and its maximum capacity is 2048 words. The RAM used as a general purpose register is the bi-dimensional 4 bit/word configuration and its capacity is 128 words.

Figure 4:
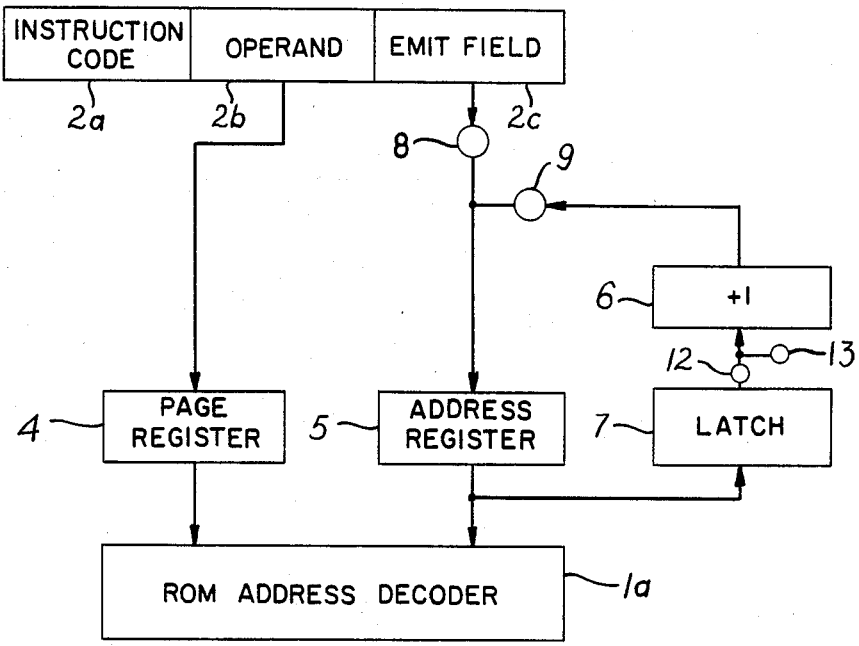
FIG. 4 is a block diagram of a circuit for designating an address of the ROM.

FIG. 4 is a block diagram showing in block form an embodiment of the present invention. Numerals 2a–2c denote bit constructions of an instruction. Numeral 2a denotes an instruction code representing the kind of instructions, 2b denotes an operand, and 2c denotes a part specified generally as an emit-field. Numerals 4 and 5 are registers for storing addresses of the ROM. In this embodiment, a full address of the ROM is divided into two parts: a page part and an address part. Thus numeral 4 is designated as a page register and numeral 5 is designated as an address register. Numeral 6 denotes a +1 circuit which computes a data value from a latch 7 plus 1. Numerals 8 and 9 are transmission gates one of which is in an ON state and the other of which is in an OFF state alternatively. Numeral 1a is an address decoder of the ROM. In designating the ROM addresses, one instruction is necessary for changing a value of the page register 4, and a new value of the page register 4 is given as an operand of the instruction.

There are two methods for designating the values of the address parts. One method is employed in case the transmission gate 8 is in the ON state. In this case the value of the emit-field 2c is the value of the address register 5. The address designation method in this case is the next address designation method. The other method is employed in case the transmission gate 9 is in the ON state. In this case, the program counter is made up of the address register 5, the latch 7 and the +1 circuit 6. Namely, the value of the present address portion is temporarily held in the latch 7, and the "present address +1" value is computed at the +1 circuit 6 after the content of the latch 7 is fed to the +1 circuit 6 through the transmission gate, and the value is loaded again in the address register 5 as the next address value. In this case the program counter method is employed in the addressing part. The present invention is characterized in that the program counter method and the next address designation method are employed alternatively according to the kind instructions. The kind of instructions is divided into two: one is designated as an instruction for constructing the watch software; and the other is designated as an instruction for constructing the numerical computation software. Since the next address designation method is effective for the instructions for constructing the watch software, the transmission gate 8 in FIG. 4 is ON. In this case the address to be next executed is written in the emit-field 2c.

Figures 5, 6:
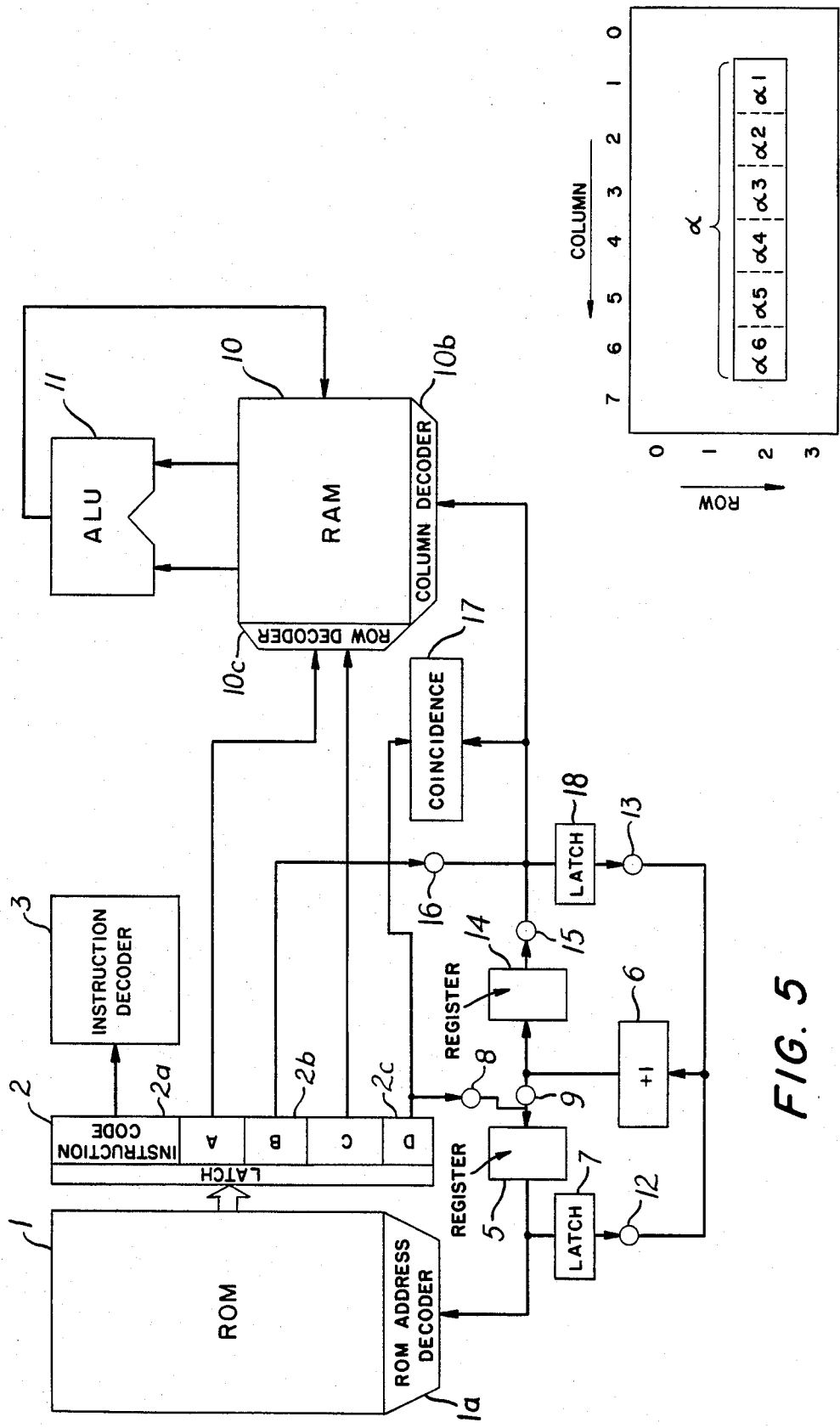
FIG. 5 is a block diagram of a circuit for operating a value which extends over several words of the RAM as shown in FIG. 3.
FIG. 6 is an example of a RAM access in the continuous arithmetic operations.

On the other hand, since the program counter method is effective for the instruction for constructing the numerical computation software, the transmission gate 9 is ON. It is to be noted here that if the emit-field 2c is not in use when the program counter method is adopted, there is no merit in adopting the program counter method. In other words, the present invention is advantageous in that the emit-field 2c, which is not in use for the address designation in adopting the program counter method, can be used for another purpose. Namely, since a comparatively complicated operation by a single instruction is required for the instruction for constructing the numerical computation software, more operands than the instruction for watches is necessarily required. For that, a powerful operation instruction can be obtained by using the emit-field 2c as an operand as shown in FIG. 5.

Referring to the detailed reasons why I have adopted such an intricate addressing method, it is the fact that such instructions as judge, branch and jump are employed most often in watch software.

Tables 1 and 2 show the results of the examination on the frequency of use of instructions in two programs for different types of watch functions, using programmable ICs fabricated by one IC manufacturer.
Table 1: a watch with alarm, timer and chronograph
Table 2: a soccer game watch

TABLE 1

The frequency of use of instructions in a program for a watch with alarm, timer and chronograph

| KIND OF INSTRUCTION | PERCENTAGE |
| --- | --- |
| JUDGE BRANCH | 25.7% |
| JUMP | 22.3% |
| ARITHMETIC | 13.5% |

TABLE 1-continued

The frequency of use of instructions in a program for a watch with alarm, timer and chronograph

| KIND OF INSTRUCTION | PERCENTAGE |
| --- | --- |
| TRANSFER | 14.7% |
| DISPLAY | 14.0% |
| MISCELLANEOUS | 9.8% |

TABLE 2

The frequency of use of instructions in a program for a soccer game watch

| KIND OF INSTRUCTION | PERCENTAGE |
| --- | --- |
| JUDGE BRANCH | 27.3% |
| JUMP | 22.4% |
| ARITHMETIC | 17.2% |
| TRANSFER | 10.8% |
| DISPLAY | 13.7% |
| MISCELLANEOUS | 8.6% |

Judging from the results I have obtained, it is found that there is relatively less change in respect of the kind of instructions to be employed, even if specifications are different, and furthermore that such instructions as judge, branch and jump are employed most frequently. From this point, limiting to the watch functions, it seems to be advantageous to adopt the next address method which is easy to judge, to branch and to jump. On the contrary, in programming for a desk-top calculator, these instructions will decrease in frequency of use. Such instructions as the arithmetic and the transfer, which require numerous operands, will increase in the frequency of use.

From this point, in the programming for the calculator, it is advisable to adopt a program counter method, and to employ the field an operand which is used for designating the next address in the next address method.

Figure 1:
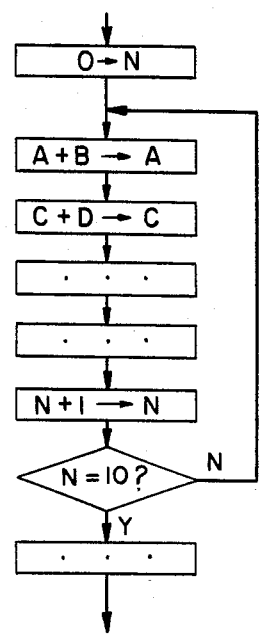
FIGS. 1 and 2 show exemplary features of two kinds of software.
Figure 2:
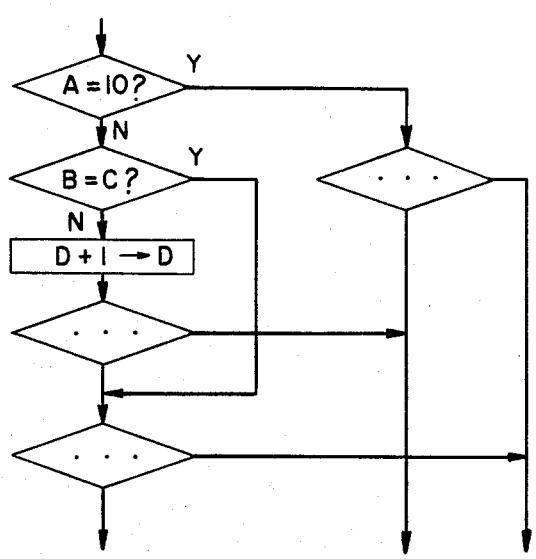

In programming for watches which are provided with such data processing functions as numerical computations for the calculator, I have aimed at such an architecture that both programs for the watch and for the calculator are incorporated effectively. Consequently, I have adopted the addressing method as shown in FIG. 2.

For such instructions as judge, branch and jump for which fewer operands are required, the "emit-field" serves as the next address.

On the contrary, for the instructions like arithmetic operations, the "emit-field" serves as the operand. Therefore, I can well achieve the purposes as explained above.

FIG. 5 is a circuit for operating a value which extends over several words of the RAM as shown in FIG. 3. An address of an instruction stored in a ROM 1 designated by a register 5 is accessed and temporarily held in a register 2. The instruction held in the register 2 consists of an instruction code representing the kind of instructions, and three fields A, B and C which are operands for the instruction. The instruction code is fed to an instruction decoder 3 which produces various signals necessary for executing an instruction. The operand A is inputted to a row decoder 10c of a RAM 10 and the operand B is inputted to a transmission gate 16. The operand C is inputted to a row decoder 10c. An output from the register 5 is inputted to an address decoder 1a of the ROM 1 and also inputted to a transmission gate 12 through the latch 7, and an output from the transmission gate 12 is fed to the +1 circuit 6. An output from a transmission gate 11 is fed to the +1 circuit 6 as well. An output from the +1 circuit 6 is fed to the register 5 through the transmission gate 9 and a register 14. An output from the register 14 is inputted to a transmission gate 15. Outputs from the transmission gates 16 and 15 are connected and inputted to the transmission gate 13 through the latch 18, the coincidence circuit 17 and a column decoder 10b of the RAM 10. The RAM 10 consists of two-dimensional arrangement of a column-×row which is twice recalled and once written in one machine cycle. Read-out two data is fed to an ALU 11 and the operated result is written in the RAM 10 again.

The operation of the circuitry shown in FIG. 5 will be illustrated taking one instruction for instance. The instruction taken as an instance is an instruction that makes a region $\alpha$ in RAM 10 as shown in FIG. 6 "0" by a single instruction. This instruction is called "SET 0". In changing the ROM addresses, the transmission gate 12 is ON and the transmission gate 16 is OFF to construct a program counter with the register 5 and the +1 circuit 6. When the value of the register 5 is changed to be an address in which the "SET 0" instruction is written, the "SET 0" instruction is stored in the register 2. At this time the instruction code corresponds to the "SET 0", and the instruction decoder 3 decodes the code and produces various control signals necessary for the "SET 0". Since the A field of the register 2 designates a row of the RAM 10, the value of the A field is "2". At the initial stage of executing the "SET 0" instruction, the transmission gate 16 is ON, and thus the value of the B field of the register 2 designates a column of the RAM 4. When the value of the B field is "1", $\alpha 1$ in FIG. 6 is designated out of the words of the RAM 4. Then "0" is written in the $\alpha 1$ and one machine cycle is finished. In order to prevent the content of the register 5 from being changed in transferring to the next machine cycle, a clock fed to the register 5 is stopped, whereby the content of the register 2 is still "SET 0". At the next machine cycle, the transmission gates 12 and 16 are closed and the transmission gates 15 and 13 are opened, whereby the designation of a column can be advanced by one. Namely $\alpha 2$ in FIG. 6 is accessed at the second machine cycle. Thus continuous arithmetic operations are enabled by stopping the clocks of the register 5 and using the +1 circuit for designating columns of the RAM.

When columns of the RAM are advanced and "0" is written in $\alpha 6$ shown in FIG. 6, the output from the transmission gate 15 is naturally "6". So, if "6" is previously written in the D field of the register 2, a coincidence detecting signal can be taken from the coincidence circuit 17. When the transmission gate 12 is opened and the transmission gate 13 is closed and a clock pulse is inputted to the register 5 taking advantage of the coincidence detecting signal, the content of the register 5 advances by 1 step and the next instruction of "SET 0" can be executed.

As illustrated hereinbefore, the +1 circuit which consists of the program counter is used for changing the RAM address for the continuous arithmetic operations since the ROM addresses need not be changed during the execution of the continuous arithmetic operations, whereby the present invention is effective to miniaturize the hardware circuits except for the ROM and RAM in fabricating a microprocessor type LSI for watches.

As illustrated, the present invention provides an address designation method which makes much of both the instructions for constructing the watch software and the numerical computation software by employing the program counter method and the next address designation method alternatively. Thus the present invention has a large applicability to the construction of future digital watch ICs.

What is claimed is:

1. In an electronic timepiece having a ROM and a RAM: an address designation circuit for the ROM comprising an address register for storing the content of an emit-field through first gate means, a ROM address decoder for receiving the output of said address register and designating the address of the ROM, a +1 circuit for computing the content of said address register plus 1, and second gate means for controlling the connection between said +1 circuit and said address register.

2. In an electronic timepiece as claimed in claim 1, including means connecting the first and second gate means so that while said first gate means opens, said second gate means closes.

3. In an electronic timepiece as claimed in claim 1, including means connecting the first and second gate means so that when said address register receives the output of said +1 circuit, said emit-field is used as an operand.

4. An electronic timepiece comprising: means including a time standard for keeping time, a ROM, a RAM, an address designation circuit for the ROM and RAM having a ROM address register for storing the content of an emit-field through first gate means, a ROM address decoder for receiving the output of said ROM address register and designating the address of the ROM, a +1 circuit for computing the content of said ROM address register plus 1 and for providing the content of said +1 circuit to a RAM address register and for providing the content of said +1 circuit through second gate means to said ROM address register, a RAM address decoder including a column decoder and row decoder and controlled by a fixed field of an instruction register and said RAM address register.

* * * * *